(No Model.)
J. N. PRINGLE.
BRAKE SHOE.
No. 603,343. Patented May 3, 1898.
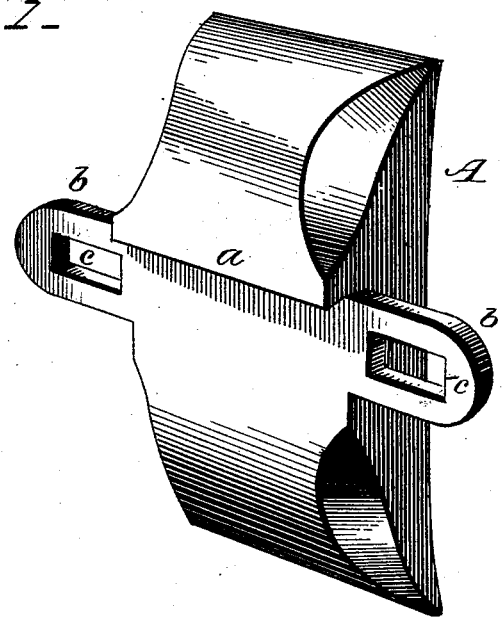
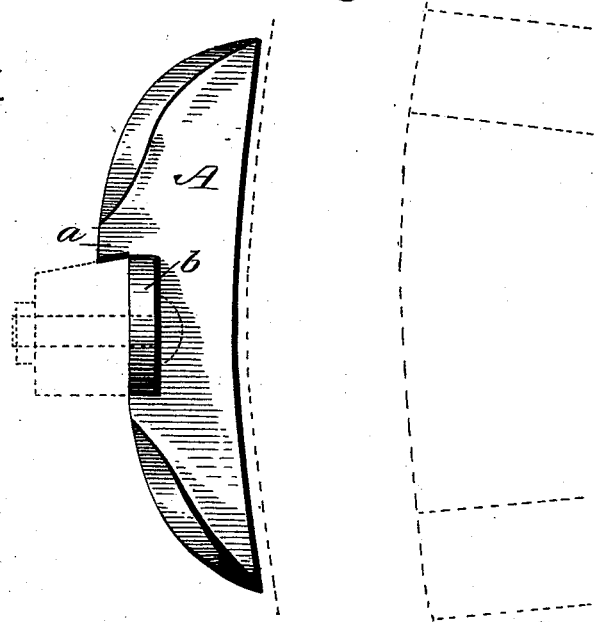
Witnesses
Williamson
Wm. E. Bond
Inventor
John N. Pringle.
per Chas. H. Fowler
Attorney

UNITED STATES PATENT OFFICE.

JOHN N. PRINGLE, OF MILLEDGEVILLE, PENNSYLVANIA.

BRAKE-SHOE.

SPECIFICATION forming part of Letters Patent No. 603,343, dated May 3, 1898.

Application filed June 9, 1897. Serial No. 640,007. (No model.)

*To all whom it may concern:*

Be it known that I, JOHN N. PRINGLE, a citizen of the United States, residing at Milledgeville, in the county of Mercer and State of Pennsylvania, have invented certain new and useful Improvements in Brake Shoes or Blocks; and I do hereby declare that the following is a full, clear, and exact description of the same, reference being had to the annexed drawings, making a part of this specification, and to the letters of reference marked thereon.

The present invention has for its object to provide a metal brake-shoe that will be simple in construction and effective in operation and when applied to the tire of the vehicle-wheel will perfectly act to produce the required frictional contact therewith; and the invention consists in a brake shoe or block constructed substantially as shown in the drawings and hereinafter described and claimed.

Figure 1 of the drawings is a perspective view of a brake shoe or block constructed in accordance with my invention; Fig. 2, a side elevation thereof.

In the accompanying drawings, A represents the brake shoe or block cast with an undercut shoulder $a$ and laterally-extending arms $b$ with elongated openings $c$.

This brake shoe or block is formed of a single piece of metal with the undercut shoulder and arms. Therefore the necessity of bolting or otherwise fastening flanges or plates by means of bolts or screws for the purpose of attaching the brake-bar thereto is entirely avoided.

The brake shoe or block, as shown in the drawings, is complete in itself and ready for attaching to the brake-bar without any additional appliances except screws or bolts, usually employed.

The shoulder $a$ rests on the brake-bar, and thus the strain is taken off the arms $b$ when the brake shoe or block is applied to the rim of the vehicle-wheel.

The slotted arms $b$ being cast with the brake shoe or block, there are no screws, bolts, or other fastenings to become loose or break off, which advantage is considered a very important one when the brake is applied to heavy wagons.

The elongated openings $c$ in the arms $b$ enable the adjustment of the brake shoe or block on the brake-bar, so as to adapt it to the dish of the wheel, also to adapt the shoe or block to old brake-bars where wooden shoes or blocks have been used, so that the same holes in the bars may be used for the fastening screws or bolts.

The undercut of the shoulder $a$ provides a better and more secure bearing for the shoe or block when the brake-arm is attached.

A brake shoe or block constructed in accordance with my invention is both simple and practical and can be manufactured and placed upon the market at a comparatively small cost to bring it within the reach of those desiring such an article.

Having now fully described my invention, what I claim as new, and desire to secure by Letters Patent, is—

As an improved article of manufacture, a metal brake shoe or block cast with a bearing-flange or overhanging shoulder extending across its outer side the entire width thereof and also cast with laterally-extending arms upon each side of the shoe or block which have elongated openings to admit of the adjustment of said shoe or block to the dish of the wheel when secured by bolts, substantially as and for the purpose set forth.

In testimony that I claim the above I have hereunto subscribed my name in the presence of two witnesses.

JOHN N. PRINGLE.

Witnesses:
J. W. GARDINER,
JOHN L. MATTOX.